June 24, 1930.  P. GRESSER  1,766,897
GREASE GUN
Filed Dec. 8, 1928
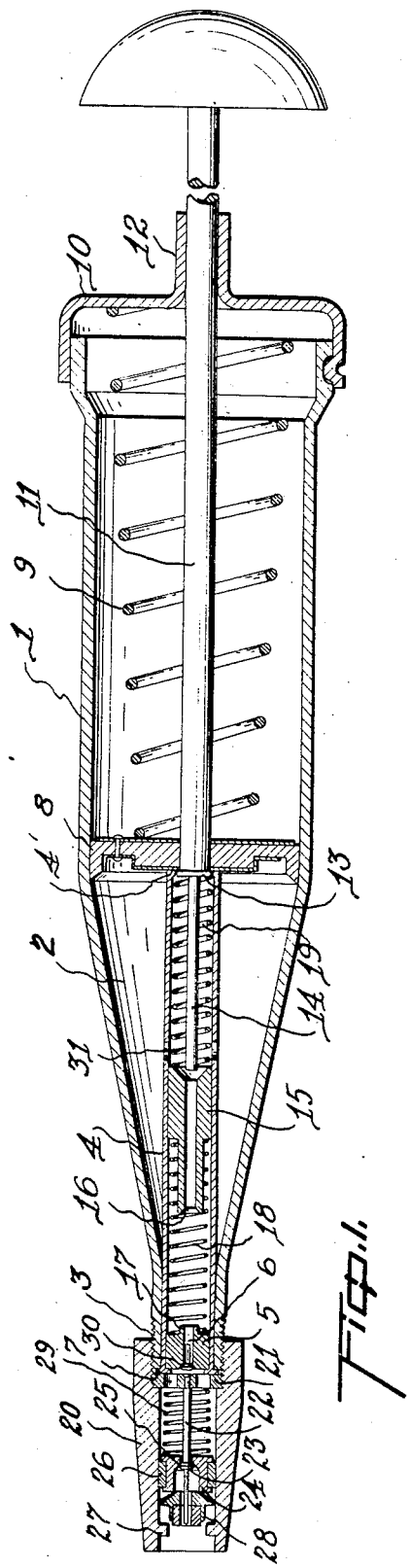
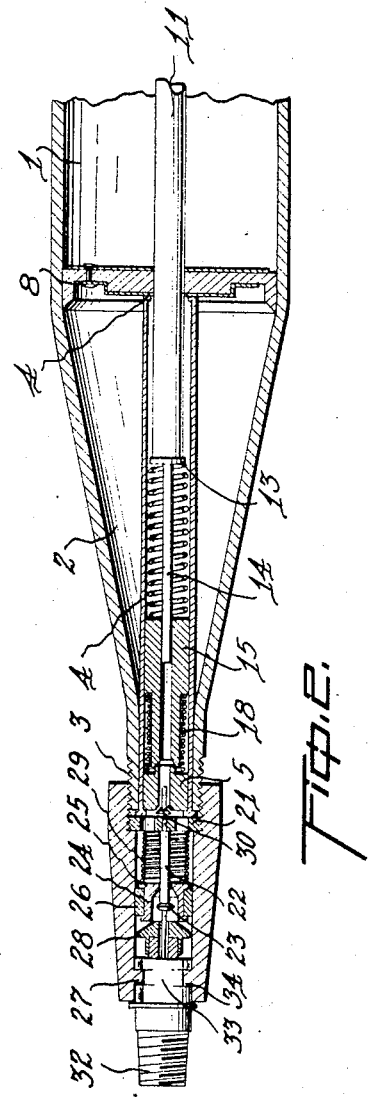
Inventor
*Peter Gresser*
By
Attorneys Patented June 24, 1930

1,766,897

UNITED STATES PATENT OFFICE

PETER GRESSER, OF DETROIT, MICHIGAN

GREASE GUN

Application filed December 8, 1928. Serial No. 324,671.

The present invention pertains to a novel grease gun of the type designed for the lubrication of bearings of motor vehicles and other machines.

The principal object of the invention is to provide a device of this character whereby the lubricant is first trapped in a confined volume and then, by a continuous stroke of the plunger of the gun, forced into the bearing.

With this object in view, the gun comprises a cylinder and a tube adapted to receive the lubricant. A suitable coupling is provided for connecting the tube to the bearing. A valved abutment is mounted in the outlet end of the tube, and adjacent this abutment is a sliding valve normally separated from the abutment by a spring. A plunger slides through the cylinder and tube and is normally spaced from the sleeve by a spring which is stronger than that first mentioned. When the plunger is first actuated in the operation of the device, the sleeve is permitted to approach the abutment by the compression of the first mentioned weaker spring and by the resistance presented by the stronger spring. This movement of the plunger and sleeve merely confines the available lubricant to a comparatively small volume, and the next movement of the plunger causes compression of the stronger spring and forces the confined lubricant into the bearing.

The invention is fully disclosed by way of example in the following description and in the accompanying drawing, in which—

Figure 1 is a longitudinal section of the device in idle condition and unattached to a bearing; and Fig. 2 is a similar detail section showing the device coupled to a bearing and at the end of the first stage of its operation.

Reference to these views will now be made by use of like characters which are employed to designate corresponding parts throughout.

The body of the device comprises a cylinder 1 which tapers at 2 towards its outlet end and is there externally threaded at 3. A tube 4 within the tapered end 2 extends rearwardly from the tip and is there equipped with an abutment 5 having a longitudinal port 6. The abutment rests against a flange 7 at the outer end of the tube 4.

Within the cylinder 1 is a piston 8 normally held against the inner end of the tube 4 by means of a spring 9 which also bears against a cap 10 covering the remaining end of the cylinder. A plunger 11 is slidably mounted in the axis of the cylinder, but is supported centrally of the piston and in a central boss 12 formed up from the cap 10. Forwardly of the piston, the plunger has a shoulder 13 which limits retraction of the plunger, and is then reduced in the nature of a stem 14 and extends a considerable distance forwardly into the tube 4.

Between the abutment 5 and the plunger, the tube 4 contains a slidable sleeve 15, the forward end of which is formed with a seat 16 adapted to receive the reduced rear end 17 of the abutment 5 as will presently appear. A comparatively light spring 18 is disposed between the abutment and the sleeve, and a stronger spring 19 is positioned between the sleeve and the swaged rear end 4' of the tube 4.

On the threaded end 3 is screwed a coupling member or nozzle 20 which contains a spider 21 against the flange 7. Into this spider is anchored one end of a rod 22 carrying a valve head 23. Slidable in the nozzle is a valve member or thimble 24 having a valve seat 25 adapted to cooperate with the valve head 23 and equipped with an outer packing ring or gasket 26. The forward end of the coupling body has a pair of internal lugs 27 for a purpose which will presently appear, and behind these lugs is a sliding coupling body 28 receiving the forward end of the stem 2 and abutting the thimble 24. A spring 29 surrounding the stem 22 between the spider 21 and the thimble 24 tends to move the latter outwardly.

A check valve head 30 floats in the port 6 of the member 5 and is positioned to close the port when drawn inwardly. Finally, the tube 4 has apertures 31 establishing communication with the cylinder.

In the operation of the device, the lubricant contained in the cylinder is advanced towards the tapered portion 2 by means of the spring pressed piston 8. In the idle position of the device, there is considerable space between the ported abutment 5 and the sleeve 15, which is filled with lubricant by the means described. Also, the thimble 26 is expelled outwardly to its limit by the spring 29 and closes against the valve head 23.

The nozzle 20 is adapted for application to a fitting 32 of well known type having facets 33 and grooves 34 by means of which the lugs 27 are locked thereto. In passing the nozzle 20 over the fitting for this coupling, the coupling washer 28 and thimble 24 are moved inwardly, whereby the valve seat in the latter is separated from and uncovered by the valve head 23. At the same time, the forward end of the stem 22 opens a check valve (not shown) in the fitting 32.

In the initial movement of the plunger 11, the weaker spring 18 is compressed against the resistance of the stronger spring 19, as shown in Figure 2, whereby the sleeve 15 is moved forwardly into engagement with the abutment 5. The pressure with which the sleeve 15 is advanced, which is equal to the pressure of the spring 19 in its normal condition, is sufficient to force lubricant into the passage leading to the bearing, but insufficient to overcome the resistance which the bearing presents to the injection of lubricant therein. In this manner a quantity of lubricant is trapped into a confined space between the bearing proper and the reduced plunger end 14 which is now received in the sleeve. On continued movement of the plunger, sufficient pressure is required to overcome the spring 19, whereupon the trapped lubricant is injected into the bearing. It will be noted that no resistance is set up by the valve 30 which is removed from its seat on the first stage of operation as shown in Figure 2.

When pressure on the plunger is released and the latter is retracted by the spring 19, the sleeve 15 is also retracted by the spring 18. During this movement of the sleeve, a suction is created between the sleeve and the abutment 5, whereupon the floating valve 30 is drawn to a closed position against the abutment, and lubricant is drawn into this space through the ports 31 and the sleeve 15.

Although a specific embodiment of the invention has been illustrated and described, it will be understood that various alterations in the details of construction may be made without departing from the scope of the invention as indicated by the appended claims.

What I claim is:—

1. A grease gun comprising a cylinder, an outlet tube in one end thereof, a ported abutment in said tube, a sleeve slidable in said tube, a spring between said abutment and sleeve, a plunger slidably mounted in said tube and dimensioned for a sliding fit in said sleeve whereby to drive lubricant through said sleeve, a stronger spring between said sleeve and plunger, and means for admitting lubricant from said cylinder to said tube.

2. A grease gun comprising a cylinder, an outlet tube in one end thereof, a ported abutment in said tube, a check valve in the port of said abutment and mounted to open outwardly of said cylinder, a sleeve slidable in said tube, a spring between said abutment and sleeve, a plunger slidably mounted in said tube and dimensioned for a sliding fit in said sleeve whereby to drive lubricant through said sleeve, a stronger spring between said sleeve and plunger, and means for admitting lubricant from said cylinder to said tube.

3. A grease gun comprising a cylinder, an outlet tube in one end thereof, a ported abutment in said tube, a sleeve slidable in said tube, a spring between said abutment and sleeve, a plunger in said tube and adapted to move forwardly toward said sleeve, a stronger spring between said sleeve and plunger, and means for admitting lubricant from said cylinder to said tube, said plunger having a portion adapted to enter and obstruct said sleeve.

4. A grease gun comprising a cylinder, an outlet tube in one end thereof, a ported abutment in said tube, a check valve in the port of said abutment and mounted to open outwardly of said cylinder, a sleeve slidable in said tube, a spring between said abutment and sleeve, a plunger in said tube and adapted to move forwardly towards said sleeve, a stronger spring between said sleeve and plunger, and means for admitting lubricant from said cylinder to said tube, said plunger having a portion adapted to enter and obstruct said sleeve.

5. A grease gun comprising a cylinder, an outlet tube in one end thereof, a ported abutment in said tube, a sleeve slidable in said tube, a spring between said abutment and sleeve, a plunger slidably mounted in said tube and dimensioned for a sliding fit in said sleeve whereby to drive lubricant through said sleeve, a stronger spring between said sleeve and plunger, said tube having ports in communication with said cylinder, whereby said tube is filled with lubricant on retraction of said sleeve from said abutment under the action of said first named spring.

In testimony whereof I affix my signature.

PETER GRESSER.